(12) United States Patent
Kubo et al.

(10) Patent No.: US 11,153,733 B2
(45) Date of Patent: Oct. 19, 2021

(54) INFORMATION PROVIDING SYSTEM AND INFORMATION PROVIDING METHOD

(71) Applicant: Toyota Jidosha Kabushiki Kaisha, Toyota Aichi-ken (JP)

(72) Inventors: Chikage Kubo, Chofu (JP); Takuji Yamada, Musashino (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/372,992

(22) Filed: Apr. 2, 2019

(65) Prior Publication Data

US 2019/0327590 A1  Oct. 24, 2019

(30) Foreign Application Priority Data

Apr. 23, 2018 (JP) .............................. JP2018-082522

(51) Int. Cl.
*H04W 4/48* (2018.01)
*B60Q 9/00* (2006.01)
*H04W 4/029* (2018.01)

(52) U.S. Cl.
CPC ................ *H04W 4/48* (2018.02); *B60Q 9/00* (2013.01); *H04W 4/029* (2018.02)

(58) Field of Classification Search
CPC ........................... B60W 2540/02; G01L 15/22
See application file for complete search history.

(56) References Cited

U.S. PATENT DOCUMENTS

| | | | |
|---|---|---|---|
| 2014/0074480 A1* | 3/2014 | Gratke | B60R 16/0373 704/275 |
| 2016/0267909 A1* | 9/2016 | Hanaoka | G10L 15/065 |
| 2016/0307568 A1* | 10/2016 | Zhao | B60W 50/08 |
| 2017/0323641 A1* | 11/2017 | Shimizu | B60R 16/02 |
| 2018/0039918 A1* | 2/2018 | Koga | G08G 1/202 |
| 2018/0096699 A1* | 4/2018 | Shintani | G06F 3/167 |
| 2019/0003848 A1* | 1/2019 | Hoten | G01C 21/3438 |

FOREIGN PATENT DOCUMENTS

JP    2013205523 A    10/2013

\* cited by examiner

*Primary Examiner* — Fabricio R Murillo Garcia
(74) *Attorney, Agent, or Firm* — Dinsmore & Shohl LLP

(57) ABSTRACT

An information providing system includes a detection information acquisition unit configured to acquire a detection result of a vehicle sensor, an occupant information database configured to hold occupant information generated based on a previous detection result of the vehicle sensor, and an output controller configured to, when information relating to an occupant acquired from the detection result of the vehicle sensor conforms to the occupant information held in the occupant information database, output provided information according to the occupant information to the occupant.

14 Claims, 6 Drawing Sheets

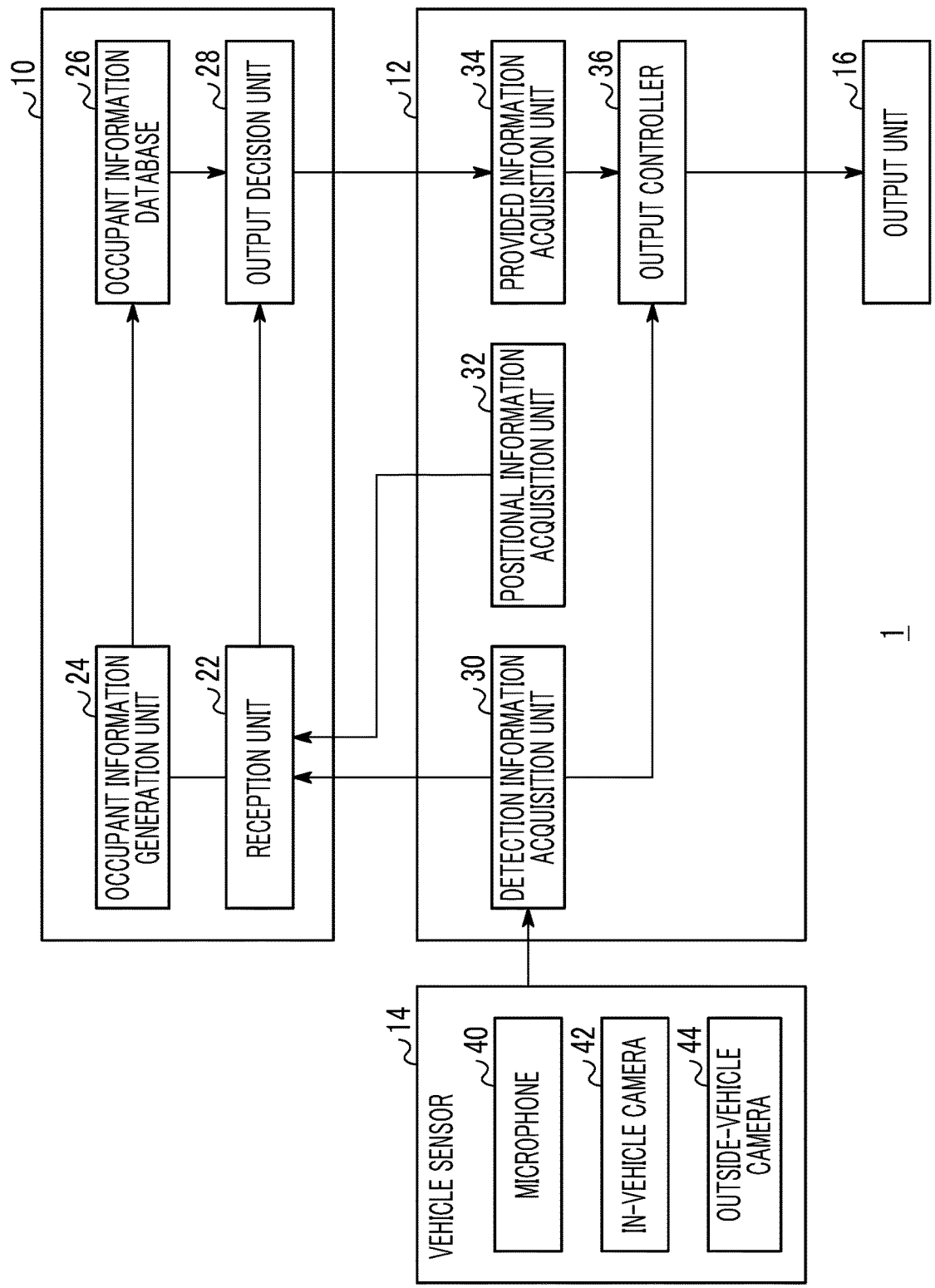

FIG. 3A

| OCCUPANT ID | IDENTIFICATION INFORMATION | BOARDING INFORMATION | UTTERANCE INFORMATION | EVENT INFORMATION |
|---|---|---|---|---|

FIG. 3B

| EVENT ID | OCCUPANT INFORMATION | IMAGE INFORMATION | UTTERANCE INFORMATION | POSITIONAL INFORMATION |
|---|---|---|---|---|

INFORMATION PROVIDING SYSTEM AND INFORMATION PROVIDING METHOD

CROSS-REFERENCE TO RELATED APPLICATIONS

This application claims priority to Japanese Patent Application No. 2018-082522 filed on Apr. 23, 2018, which is incorporated herein by reference in its entirety including the specification, drawings and abstract.

BACKGROUND

1. Technical Field

The present disclosure relates to an information providing system and an information providing method that provide information to an occupant of a vehicle.

2. Description of Related Art

Japanese Unexamined Patent Application Publication No. 2013-205523 (JP 2013-205523 A) discloses a response generation server that ascertains an utterance of a user and performs a response. The response generation server acquires utterance information uttered by the user and history information of previous three utterances from a user terminal, requests an application programming interface (API) server for information for generating a response to the utterance information, and generates response information using information received from the API server.

SUMMARY

In providing information to an occupant of a vehicle, it is desirable to provide information according to a current boarding situation, instead of providing information having no relation to the current boarding situation.

The present disclosure provides an information providing system and an information providing method that provide information according to a boarding situation to an occupant.

A first aspect of the present disclosure relates to an information providing system. The information providing system includes a detection information acquisition unit, an occupant information database and an output controller. The detection information acquisition unit is configured to acquire a detection result of a vehicle sensor. The occupant information database is configured to hold occupant information generated based on a previous detection result of the vehicle sensor. The output controller is configured to, when information relating to an occupant acquired from the detection result of the vehicle sensor conforms to the occupant information held in the occupant information database, output provided information according to the occupant information to the occupant.

According to the first aspect of the present disclosure, since the provided information according to the occupant information held in the occupant information database is output, it is possible to provide effective information to the occupant. Furthermore, it is possible to output the provided information when information relating to the occupant acquired from the detection result of the vehicle sensor conforms to the occupant information held in the occupant information database.

A second aspect of the present disclosure relates to an information providing method. The information providing method includes acquiring a detection result of a vehicle sensor mounted in a vehicle, holding occupant information generated based on the detection result of the vehicle sensor, and when information relating to an occupant acquired from the detection result of the vehicle sensor conforms to the held occupant information, outputting provided information according to the occupant information to the occupant.

According to the second aspect of the present disclosure, since the provided information according to the held occupant information is output, it is possible to provide effective information to the occupant. Furthermore, it is possible to output the provided information when information relating to the occupant acquired from the detection result of the vehicle sensor conforms to the held occupant information.

A third aspect of the present disclosure relates to an information providing system. The information providing system includes a server device and an in-vehicle device. The server device is configured to hold occupant information generated based on a previous detection result of a vehicle sensor. The in-vehicle device is configured to acquire a detection result of the vehicle sensor, and when information relating to an occupant acquired from the detection result of the vehicle sensor conforms to the occupant information held in the server device, output provided information according to the occupant information to the occupant.

According to the third aspect of the present disclosure, since the provided information according to the occupant information held in the server device is output, it is possible to provide effective information to the occupant. Furthermore, it is possible to output the provided information when information relating to the occupant acquired from the detection result of the vehicle sensor conforms to the occupant information held in the server device.

According to the aspects of the present disclosure, it is possible to provide an information providing system and an information providing method that provide information according to a boarding situation to an occupant.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 2 is a diagram illustrating the functional configuration of the information providing system;

FIG. 3A is a diagram illustrating information that is held in an occupant information database;

FIG. 3B is a diagram illustrating information that is held in the occupant information database, and is a diagram showing event information included in occupant information shown in FIG. 3A;

DETAILED DESCRIPTION OF EMBODIMENTS

Figure 1:
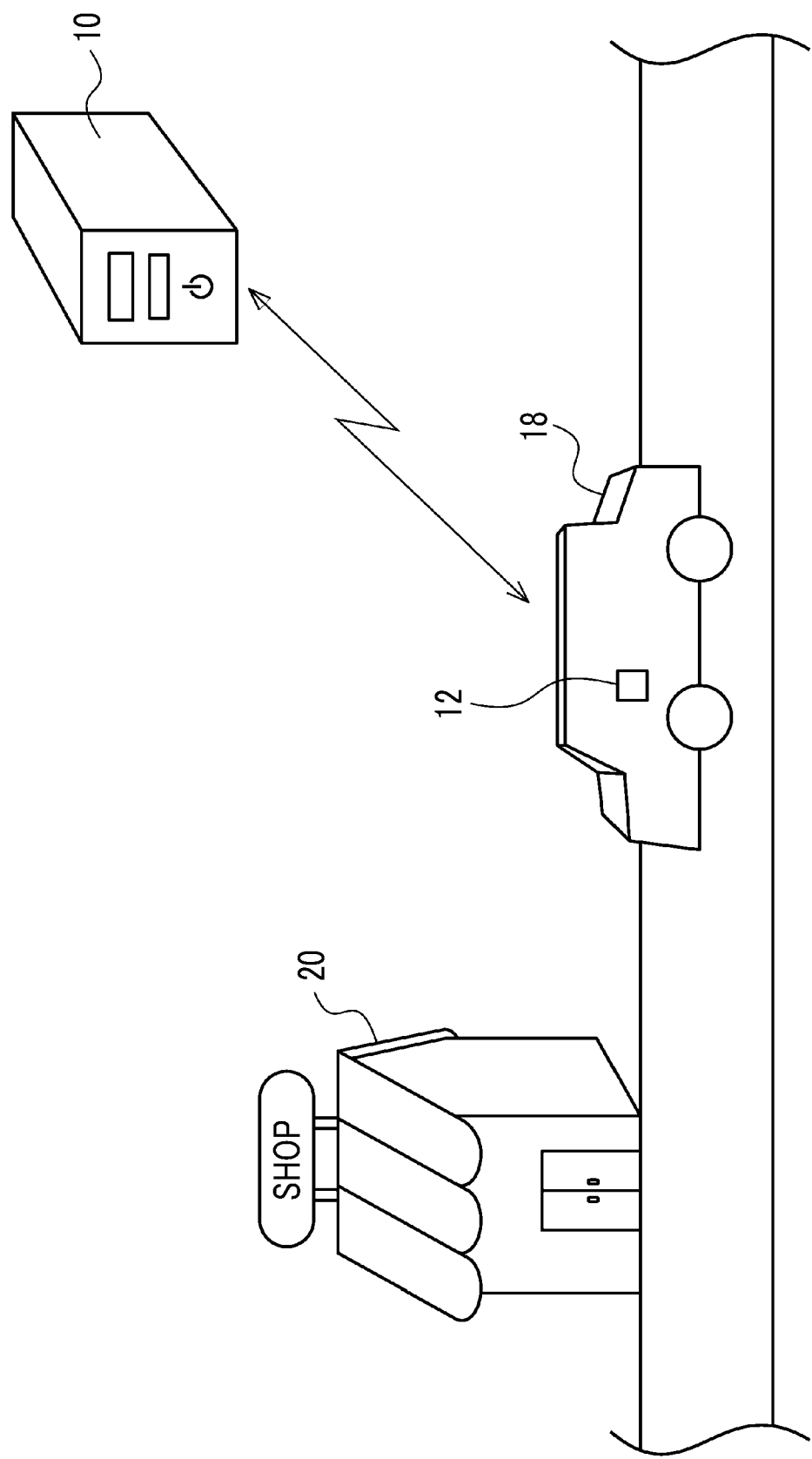
FIG. 1 is a diagram illustrating an information providing system of an example.

FIG. 1 is a diagram illustrating an information providing system of an example. The information providing system of the example includes an in-vehicle device 12 mounted in a vehicle 18, and a server device 10 that is able to transmit and receive information to and from the in-vehicle device 12 through a network.

When a driver is driving the vehicle 18, the in-vehicle device 12 transmits positional information and sensor detection information of the vehicle 18 to the server device 10 cyclically. In FIG. 1, an object 20 is positioned in the periphery of the vehicle 18. An occupant of the vehicle 18 has seen an object 20 at the time of previous driving and has uttered "an object 20 is newly opening", and the in-vehicle device 12 acquires the utterance information. In the utterance information, an utterance time, positional information at the time of the utterance, and information of each occupant who boards the vehicle at the time of the utterance are included. The in-vehicle device 12 may acquire an unintended utterance of an occupant, such as mumbling of the driver. The in-vehicle device 12 transmits the utterance information and traveling information indicating a traveling situation of the vehicle to the server device 10.

The server device 10 generates an occupant information database based on the utterance information of the occupant and the traveling information. A word preferred by the occupant can be acquired from the utterance information of the occupant, and an action history of the occupant can be acquired from the traveling information. The server device 10 receives the detection information and the positional information of the vehicle 18, and decides to output provided information using occupant information held in the occupant information database according to a situation of the vehicle 18. For example, when the vehicle 18 is traveling near the object 20, the server device 10 generates provided information based on information that the occupant has conversation about the object 20 and transmits the provided information to the in-vehicle device 12. When the provided information is received from the server device 10, the in-vehicle device 12 outputs the provided information to the driver through a display or by voice.

In this way, the provided information is output to the occupant based on the occupant information database generated by the server device 10, whereby it is possible to provide information that the occupant is interested in.

FIG. 2 is a diagram illustrating the functional configuration of an information providing system 1. In FIG. 2, elements that are described as functional blocks for performing various kinds of processing can be constituted of a circuit block, a memory, and other large scale integrations (LSIs) in terms of hardware or are realized by a program or the like loaded in a memory in terms of software. Accordingly, it can be understood by those skilled in the art that the functional blocks can be realized in various forms by hardware solely, software solely, or a combination of hardware and software, and are not limited to either one.

The server device 10 includes a reception unit 22, an occupant information generation unit 24, an occupant information database 26, and an output decision unit 28. The in-vehicle device 12 includes a detection information acquisition unit 30, a positional information acquisition unit 32, a provided information acquisition unit 34, and an output controller 36.

A vehicle sensor 14 includes a microphone 40, an in-vehicle camera 42, and an outside-vehicle camera 44. The microphone 40 is provided to detect in-vehicle voice, converts voice including an utterance of an occupant to an electrical signal, and sends the signal to the detection information acquisition unit 30.

The in-vehicle camera 42 captures an image inside the vehicle and sends an in-vehicle captured image to the detection information acquisition unit 30. With the in-vehicle captured image, it is possible to specify an occupant inside the vehicle. The outside-vehicle camera 44 captures an image in the periphery of the vehicle and sends an outside-vehicle captured image to the detection information acquisition unit 30. It is possible to acquire information of a point where the occupant goes from the outside-vehicle captured image. All detection results of the microphone 40, the in-vehicle camera 42, and the outside-vehicle camera 44 are attached with time stamps such that date and time is recognized.

An output unit 16 is a speaker or a display, and outputs information to the occupant in a form of voice or an image under the control of the output controller 36.

The detection information acquisition unit 30 of the in-vehicle device 12 acquires in-vehicle voice information, the in-vehicle captured image, and the outside-vehicle captured image as the detection results of the vehicle sensor 14 mounted in the vehicle, and sends the in-vehicle voice information, the in-vehicle captured image, and the outside-vehicle captured image to the reception unit 22 of the server device 10 cyclically. The positional information acquisition unit 32 acquires the positional information of the vehicle and sends the positional information of the vehicle to the reception unit 22 of the server device 10 cyclically. The detection information acquisition unit 30 acquires the positional information of the vehicle using a global positioning system (GPS), and acquires the positional information of the vehicle from a car navigation device, for example.

The provided information acquisition unit 34 acquires provided information from the server device 10. The output controller 36 performs control such that the output unit 16 provides the provided information acquired by the provided information acquisition unit 34 to the occupant in a form of voice or an image. The output controller 36 may recognize an utterance of the occupant and may output a response to the utterance. For example, the output controller 36 may display an agent character and may perform control such that the agent character interacts with the occupant. The output controller 36 executes a session of the agent character and the occupant with an utterance of a trigger phrase of the occupant as a trigger.

The reception unit 22 of the server device 10 sends the received in-vehicle voice information, in-vehicle captured image, and outside-vehicle captured image to the occupant information generation unit 24 and the output decision unit 28.

The occupant information generation unit 24 generates occupant information based on the in-vehicle voice information, the in-vehicle captured image, and the outside-vehicle captured image. The occupant information database 26 holds the occupant information generated based on the detection results of the vehicle sensor 14. The occupant information will be described referring to FIGS. 3A and 3B.

FIGS. 3A and 3B are diagrams illustrating information that is held in the occupant information database 26. As shown in FIG. 3A, the occupant information database 26 holds identification information, boarding information, utterance information, and event information of an occupant in association with an occupant identifier (ID).

The occupant information database 26 specifies an occupant using the identification information of the occupant, and the occupant information database 26 holds the occupant information for each occupant. The identification information of the occupant is a feature quantity for analyzing the in-vehicle captured image and performing face recognition processing or a feature quantity for performing voiceprint determination processing. The identification information of the occupant may be updated regularly. The occupant information generation unit 24 specifies an occupant using face recognition processing, voiceprint determination processing, or the like. When an occupant cannot be specified, the occupant information generation unit 24 generates an occupant ID and identification information as a new occupant and holds the occupant ID and the identification information in the occupant information database 26.

The boarding information includes date and time on which an occupant boards the vehicle and an unboarding point. In the boarding information, a fellow occupant ID may be included or traveling route information may be included. The boarding information is generated based on the positional information of the vehicle. A boarding history of an occupant is held by the boarding information, and information at the time of previous boarding can be referred to.

The utterance information includes an uttered word uttered by an occupant and an utterance time. The occupant information generation unit 24 extracts an utterance of each occupant from voice information detected by the microphone 40 and holds the extracted uttered word in the occupant information database 26. In the utterance to be detected, an utterance not intended by an occupant, that is, mumbling of the occupant is included. The utterance not intended by the occupant is mumbling of the occupant. The unintended utterance of the occupant is acquired when the occupant does not make a session request with no utterance of a trigger phrase to the in-vehicle device 12.

The occupant information generation unit 24 classifies whether the extracted uttered word is affirmative or negative and holds the classification in the occupant information database 26. The classification regarding whether the uttered word is affirmative or negative is determined by expressions before and after the uttered word. For example, when "I want to eat curry", "I like curry", or the like is detected as the utterance of the occupant, since an affirmative expression "want to eat" or "like" is associated with "curry", the occupant information generation unit 24 determines that the occupant utters affirmatively on "curry", and holds "curry" in the occupant information database 26 as an uttered word that the occupant has an affirmative feeling.

The event information indicates an event occurred at the time of boarding of the occupant, and includes date and time on which an event occurs and an event ID. Previous event information, that is, a diary is shown to the occupant, thereby entertaining the occupant. The event information may be recorded as a situation that the occupant liked when an affirmative uttered word is detected from the occupant, may be recorded as a situation different from a daily life when the occupant is away from home at a predetermined distance or more, or is recorded when a special situation is detected.

FIG. 3B shows the event information included in the occupant information shown in FIG. 3A. The occupant information database 26 holds the event information of the occupant, thereby reading the event information as a diary and providing the event information to the occupant in the future. The occupant information database 26 holds occupant information, image information, utterance information, and positional information in association with the event ID. The occupant information includes an occupant ID of an occupant who boards the vehicle when an event occurs.

The image information includes at least one of an outside-vehicle captured image and an in-vehicle captured image captured when an event occurs. With the image information, it is possible to show the occupant a situation when a previous event occurs.

The utterance information includes an uttered word of an occupant detected when an event occurs. With the uttered word, it is possible to associate an utterance of a current occupant with a previous event, and to extract a previous event similar to a current situation. The positional information indicates a position when an event occurs. In this way, the occupant information database 26 holds information indicating a preference or an action history for each occupant.

Returning to FIG. 2, description will be continued. When the detection results of the vehicle sensor satisfy a predetermined output condition, the output decision unit 28 decides to output provided information according to the occupant information, generates the provided information, and sends the provided information to the provided information acquisition unit 34. The predetermined output condition is satisfied when information relating to an occupant acquired from the detection results of the vehicle sensor 14 conforms to the occupant information held in the occupant information database 26. Information relating to the occupant acquired from the detection results of the vehicle sensor 14 includes specified occupant information, positional information of the occupant, current time information, and an utterance.

When the degree of coincidence of a current vehicle situation and a previous vehicle situation is equal to or greater than a predetermined value, the output decision unit 28 decides to output event information at the time of coincident previous boarding as the provided information. The output decision unit 28 decides the output of the provided information based on the degree of coincidence of information relating to a current occupant detected by the vehicle sensor 14 and previous occupant information held in the occupant information database 26. When any one of the occupant information, the positional information of the vehicle, the time information, and the utterance acquired from the detection results of the vehicle sensor 14 conforms to the occupant information, the positional information, the time information, and the utterance indicated in previous event information, the output decision unit 28 decides to output the conforming previous event information as the provided information.

When a current occupant coincides with a previous occupant, the output decision unit 28 may decide to output the event information acquired at the time of coincident previous boarding as the provided information. That is, when a current occupant coincides with an occupant indicated in the event information, the output decision unit 28 decides to output the event information. Since the occupant information database 26 holds the occupant information for each occupant, the output condition of the event information includes that occupants coincide with each other. With this, it is possible to provide information of previous driving or the like of the same occupant to entertain the occupant.

When the current occupant coincides with the previous occupant and the date and time indicated in the event information of the coincident occupant matches the current date and time, the output decision unit 28 may decide to output the coincident event information as the provided information. For example, the event information of the same occupant acquired on the same date last year is provided, thereby entertaining the occupant.

When a plurality of the occupant information, the positional information of the vehicle, the time information, and the utterance acquired from the detection results coincides with the occupant information, the positional information, the time information, and the utterance indicated in the event information, the output decision unit 28 may decide to output the coincident event information as the provided information.

When a request from the occupant is received, the predetermined output condition is satisfied, and the output decision unit 28 generates a response to the request based on the occupant information of the occupant information database 26 as the provided information. The request from the occupant is, for example, information search, and in generating a search result, the output decision unit 28 refers to the utterance information held in the occupant information database 26 and generates a search result such that a word related to an affirmative uttered word is given high priority. For example, when the occupant searches for a restaurant, and when "curry" is held in the occupant information database 26 as the affirmative uttered word, the output decision unit 28 generates a search result in which a restaurant that serves curry is arranged at a higher rank in the search result or in which a nearby curry restaurant is recommended. With this, it is possible to provide effective information according to the preference of the occupant.

An affirmative uttered word is given output priority based on an utterance history including an utterance frequency and an utterance time. The greater the utterance frequency of an uttered word and the later the utterance time, the more easily the uttered word is output.

Figure 4A:
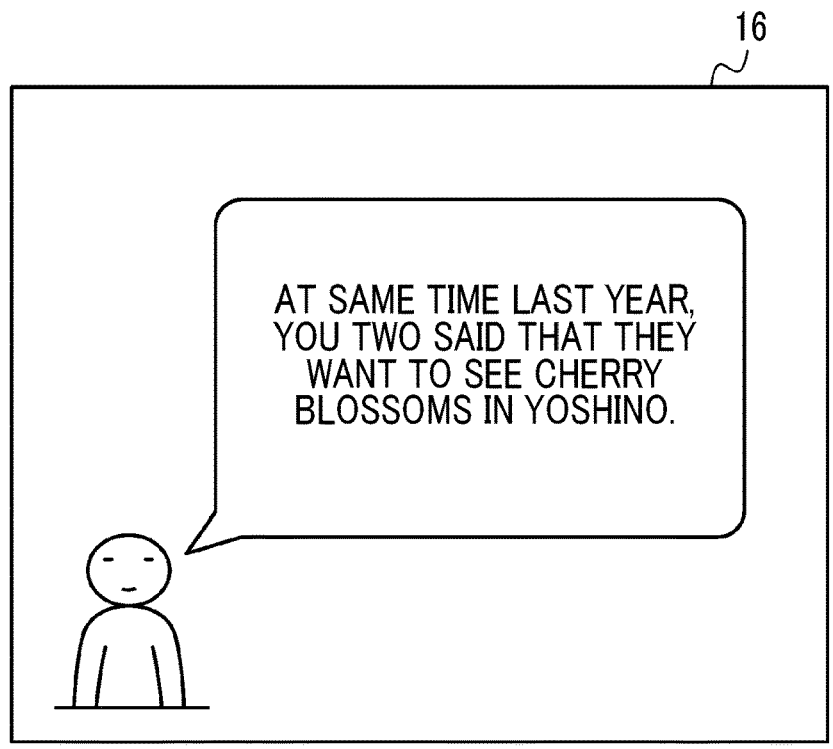
FIG. 4A is a diagram illustrating provided information that is output by an output controller.
Figure 4B:
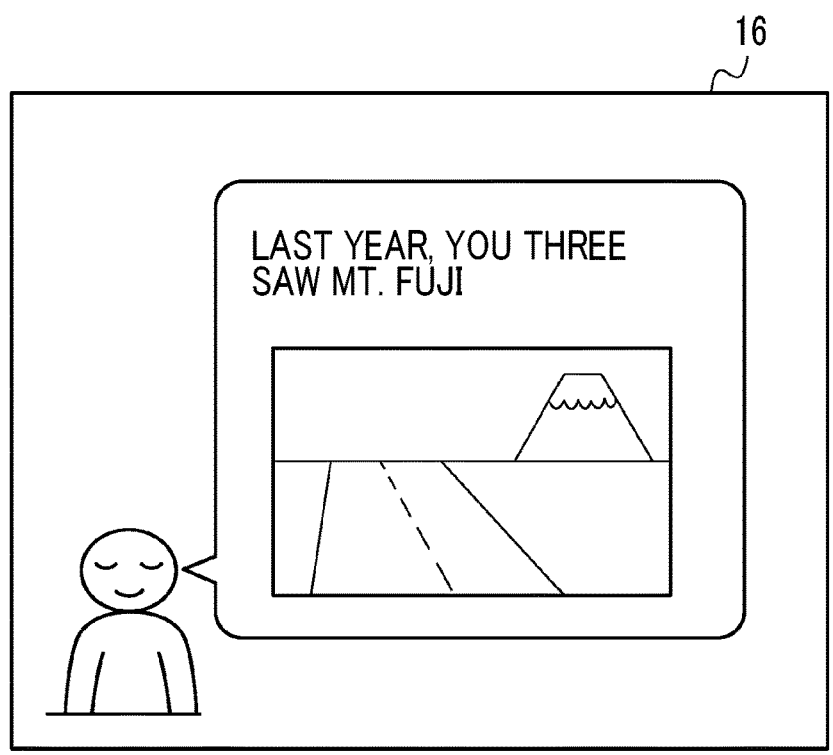
FIG. 4B is a diagram illustrating provided information that is output by the output controller.

FIGS. 4A and 4B are diagrams illustrating the provided information that is output by the output controller 36. In FIGS. 4A and 4B, an image that is displayed on the display as the output unit 16 is shown. In FIG. 4A, since a plurality of occupants, time information, and an utterance at present matches the occupant information, time information, and utterance information indicated in the event information, the event information is output in a form of text.

In FIG. 4B, since a plurality of occupants and the positional information of the vehicle at present conforms to the occupant information and the positional information indicated in the event information, the event information is output in a form of text and an image. In this way, the previous event information is output when the predetermined output condition is satisfied, whereby it is possible to restrain the occupant from having a sense of discomfort in the output of the event information, compared to when event information having no relation to the current situation is provided to the occupant.

Figure 5:
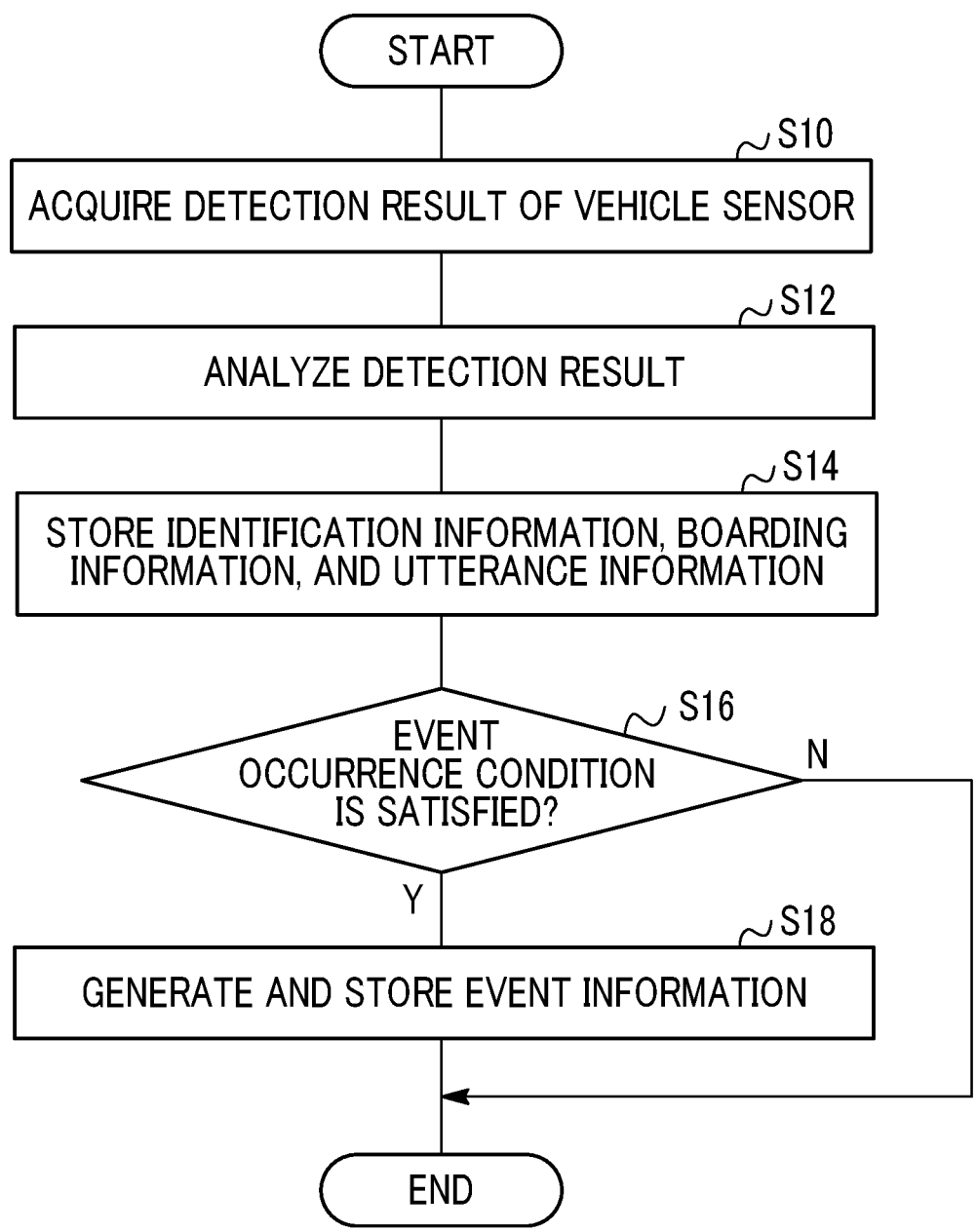
FIG. 5 is a flowchart illustrating processing for generating occupant information.

FIG. 5 is a flowchart illustrating processing for generating the occupant information. The processing for generating the occupant information may be executed, for example, every day. The detection information acquisition unit 30 of the in-vehicle device 12 acquires the in-vehicle voice information, the in-vehicle captured image, and the outside-vehicle captured image as the detection results of the vehicle sensor 14 (S10). The occupant information generation unit 24 of the server device 10 analyzes the detection results of the vehicle sensor 14 received from the in-vehicle device 12 (S12).

As shown in FIG. 3A, the occupant information database 26 stores identification information, boarding information, and utterance information of an occupant included in an analysis result (S14). The occupant information generation unit 24 determines whether or not a predetermined event occurrence condition is satisfied (S16), and when the event occurrence condition is not satisfied (in S16, N), ends the processing.

When the occupant information generation unit 24 detects a boarding situation different from the normal and when an affirmative utterance of a driver is detected, the occupant information generation unit 24 determines that the event occurrence condition is satisfied (in S16, Y), generates event information and stores the event information in the occupant information database 26 (S18), and ends the processing. In this way, the occupant information is accumulated.

Figure 6:
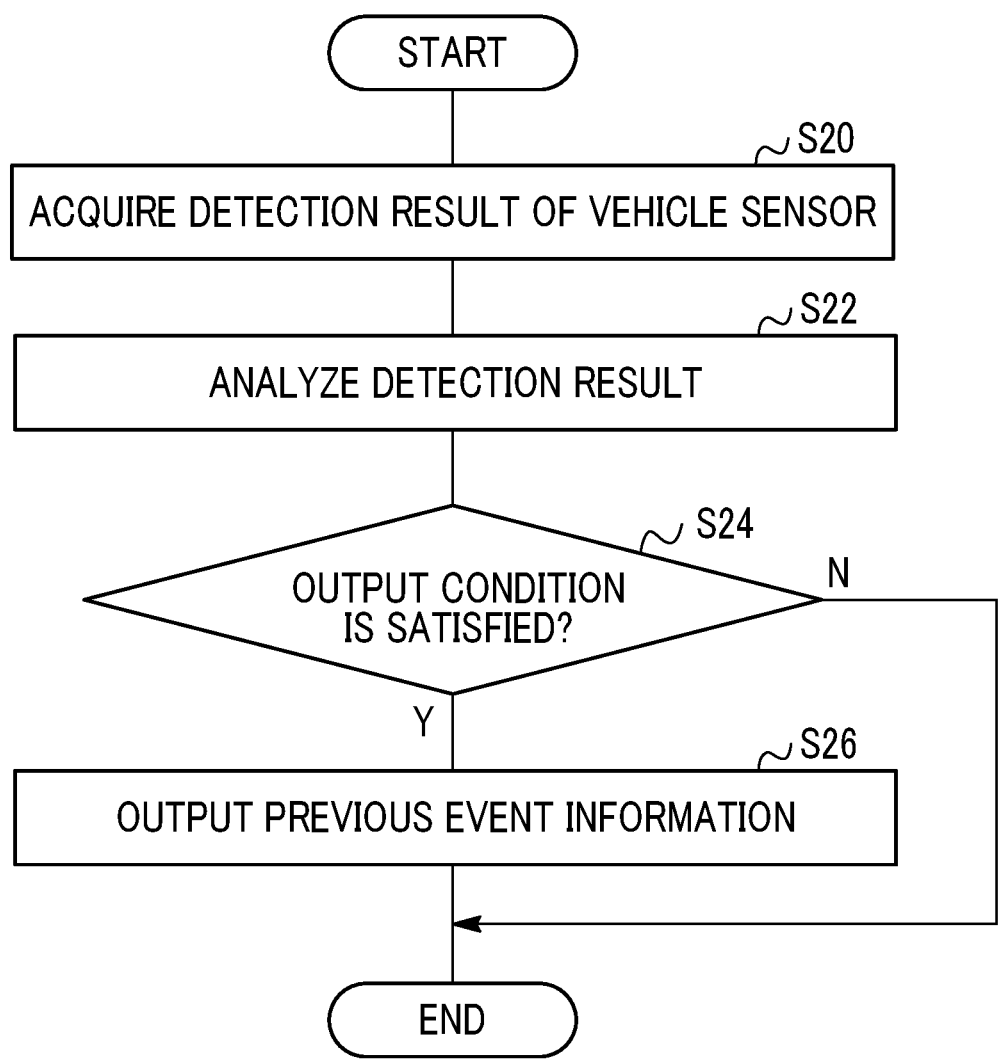
FIG. 6 is a flowchart illustrating processing for outputting provided information to an occupant.

FIG. 6 is a flowchart illustrating processing for outputting provided information to an occupant. The processing for outputting the provided information to the occupant may be executed in a predetermined cycle shorter than the processing for generating the occupant information so as to be executed in real time.

The detection information acquisition unit 30 of the in-vehicle device 12 acquires the in-vehicle voice information, the in-vehicle captured image, and the outside-vehicle captured image as the current detection results of the vehicle sensor 14 (S20). The output decision unit 28 of the server device 10 analyzes the detection results of the vehicle sensor 14 received from the in-vehicle device 12 (S22), and determines whether or not the predetermined output condition is satisfied (S24). The output decision unit 28 determines whether or not the predetermined output condition is satisfied based on the occupant information, the image information, the utterance information, and the positional information included in the event information, and the current detection results of the vehicle sensor 14, and determines that the output condition is satisfied when the degree of coincidence of a vehicle situation indicated in the previous event information and a current vehicle situation is high. When the output decision unit 28 determines that the predetermined output condition is not satisfied (in S24, N), the processing ends.

When the output decision unit 28 determines that the predetermined output condition is satisfied (in S24, Y), the previous event information that coincides with the output condition is decided to be output, and the previous event information is transmitted to the in-vehicle device 12. The output controller 36 of the in-vehicle device 12 outputs the acquired previous event information as the provided information (S26). The previous event information is output when the predetermined output condition is satisfied, whereby it is possible to restrain the occupant from having a sense of discomfort in the output of the event information compared to when unrelated event information is output, and to entertain the occupant.

The example is intended to be just illustrative, and it will be obvious to those skilled in the art that various modifications to a combination of constituent elements can be made and that such modifications also fall within the scope of the present disclosure.

In the example, the information providing system 1 may be constituted of the server device 10 and the in-vehicle device 12. The output decision unit 28 of the server device 10 may be provided in the in-vehicle device 12, and the occupant information generation unit 24 and the occupant information database 26 may be provided in the in-vehicle device 12.

In the example, the detection information acquisition unit may be configured to acquire an utterance of the occupant from a microphone included in the vehicle sensor. The occupant information database may be configured to hold occupant information generated based on the utterance of the occupant. With this, the occupant information is easily collected.

In the example, the occupant information database may be configured to classify and hold an uttered word of the occupant as affirmative or negative. With this, it is possible to hold information indicating the preference of the occupant.

In the example, the occupant information database may be configured to hold occupant information for each occupant. With this, it is possible to output the provided information according to the occupant who boards the vehicle.

In the example, the occupant information database may be configured to hold the boarding information of each occupant as the occupant information. The output controller may be configured to, when a current occupant coincides with a previous occupant, output information acquired at the time of coincident previous boarding as the provided information.

In the example, the occupant information database may be configured to hold event information at the time of previous boarding in association with the occupant. The output controller may be configured to, when a degree of coincidence of a current situation to be acquired from the detection result of the vehicle sensor and previous event information is equal to or greater than a predetermined value, output the event information at the time of previous boarding.

What is claimed is:

1. An information providing system comprising:
   a detection information acquisition unit configured to acquire a detection result of a vehicle sensor;
   an occupant information database configured to hold occupant information generated based on a previous detection result of the vehicle sensor and to hold event information comprising a date and time on which an occupant boards a vehicle associated with the vehicle sensor, positional information when the occupant boards the vehicle, and utterance information of the occupant acquired when the occupant boarded the vehicle; and
   an output controller configured to, when information relating to the occupant acquired from the detection result of the vehicle sensor conforms to the occupant information held in the occupant information database and with the acquired utterance information, and when a degree of coincidence of a current situation to be acquired from the detection result of the vehicle sensor and previous event information is equal to or greater than a predetermined value, output information associated with the previous event information.

2. The information providing system according to claim 1, wherein:
   the detection information acquisition unit is configured to acquire an utterance of the occupant from a microphone included in the vehicle sensor; and
   the occupant information database is configured to hold occupant information generated based on the utterance of the occupant.

3. The information providing system according to claim 2, wherein the occupant information database is configured to classify and hold an uttered word of the occupant as affirmative or negative.

4. The information providing system according to claim 1, wherein the occupant information database is configured to hold the occupant information for each occupant.

5. The information providing system according to claim 4, wherein:
   the occupant information database is configured to hold boarding information of each occupant as the occupant information; and
   the output controller is configured to, when a current occupant coincides with a previous occupant, output information acquired at a time of coincident previous boarding as the provided information.

6. The information providing system according to claim 1, wherein the positional information comprises a position of the vehicle when the occupant boards the vehicle.

7. An information providing method comprising:
   acquiring a detection result of a vehicle sensor mounted in a vehicle;
   holding occupant information generated based on the detection result of the vehicle sensor;
   holding event information comprising a date and time on which an occupant boards the vehicle associated with the vehicle sensor, positional information when the occupant boards the vehicle, and utterance information of the occupant acquired when the occupant boarded the vehicle;
   when information relating to the occupant acquired from the detection result of the vehicle sensor conforms to the held occupant information and with the acquired utterance information, and
   when a degree of coincidence of a current situation to be acquired from the detection result of the vehicle sensor and previous event information is equal to or greater than a predetermined value, outputting information associated with the previous event information.

8. The information providing method of claim 7, wherein the positional information comprises a position of the vehicle when the occupant boards the vehicle.

9. An information providing system comprising:
   a server device configured to hold occupant information generated based on a previous detection result of a vehicle sensor and to hold event information comprising a date and time on which an occupant boards a vehicle associated with the vehicle sensor, positional information when the occupant boards the vehicle, and utterance information of the occupant acquired when the occupant boarded the vehicle; and
   an in-vehicle device configured to acquire a detection result of the vehicle sensor, when information relating to the occupant acquired from the detection result of the vehicle sensor conforms to the occupant information held in the server device and with the acquired utterance information, and when a degree of coincidence of a current situation to be acquired from the detection result of the vehicle sensor and previous event information is equal to or greater than a predetermined value, output information associated with the previous event information.

10. The information providing system according to claim 9, wherein:
    the in-vehicle device is configured to acquire an utterance of the occupant from a microphone included in the vehicle sensor; and
    the server device is configured to hold occupant information generated based on the utterance of the occupant.

11. The information providing system according to claim 10, wherein the server device is configured to classify and hold an uttered word of the occupant as affirmative or negative.

12. The information providing system according to claim 9, wherein the server device is configured to hold the occupant information for each occupant.

13. The information providing system according to claim 12, wherein:
   the server device is configured to hold boarding information of each occupant as the occupant information; and
   the in-vehicle device is configured to, when a current occupant coincides with a previous occupant, output information acquired at a time of coincident previous boarding as the provided information.

14. The information providing system of claim 9, wherein the positional information comprises a position of the vehicle when the occupant boards the vehicle.

* * * * *